Sept. 22, 1970  W. J. PRYOR ET AL  3,529,466
ULTRASONIC INSPECTION APPARATUS FOR ROTATABLE CYLINDRICAL
OBJECTS AND BODIES OF ELASTIC MATERIAL
Filed April 14, 1967
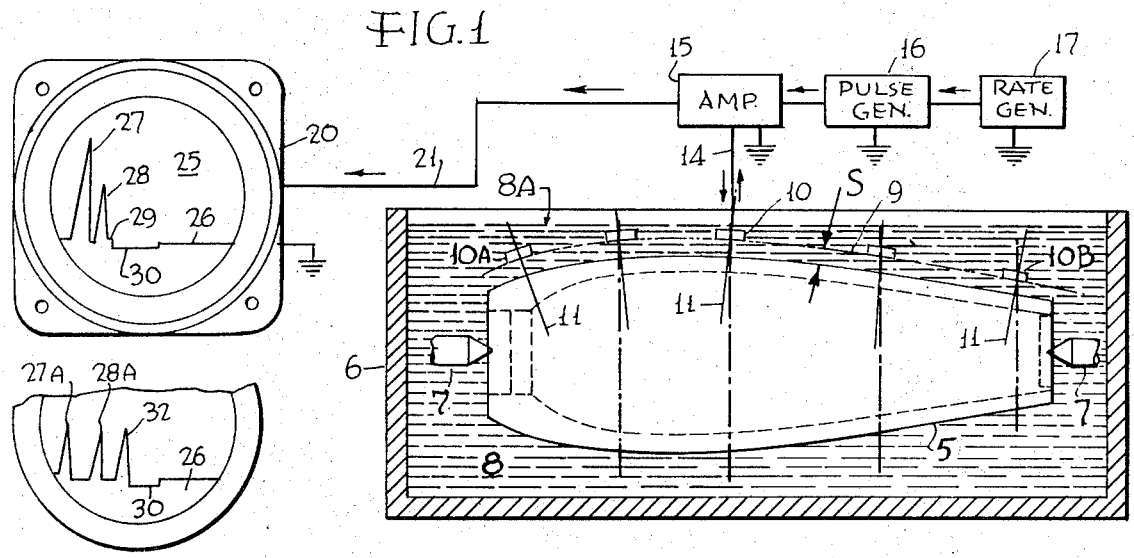
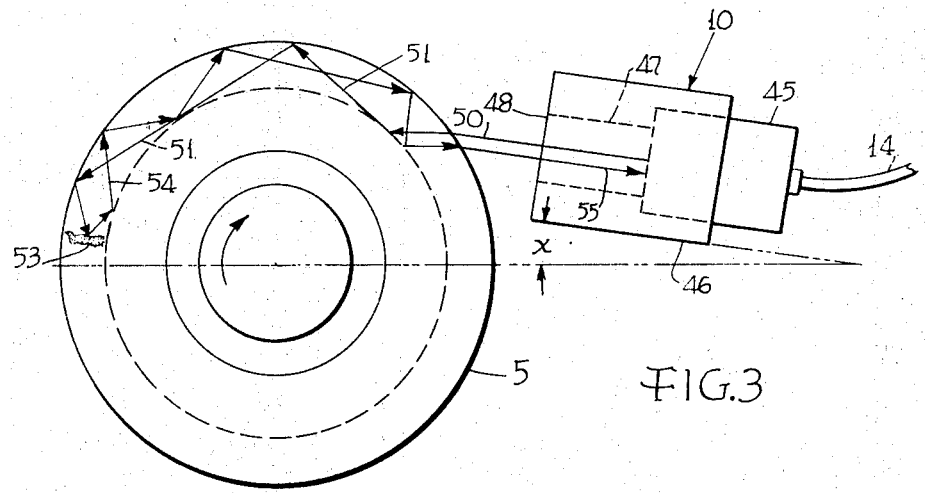
FIG. 3
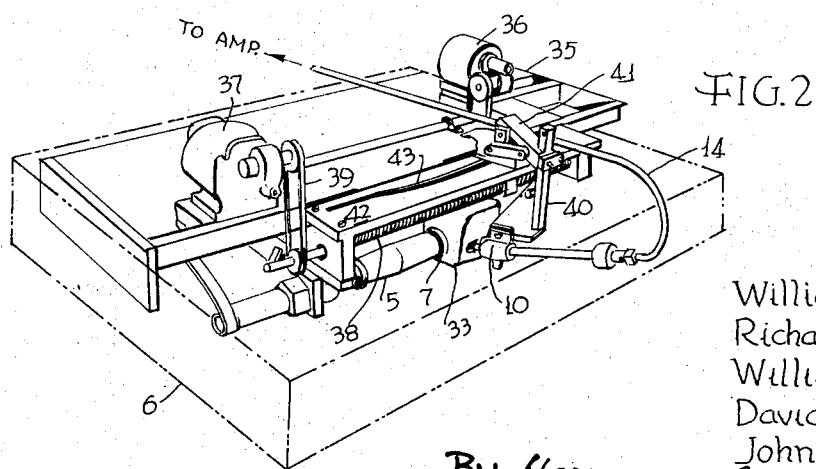
FIG. 2
INVENTORS:
William J. Pryor
Richard A. Meinert
William C. Truckenmiller
David Murphy
John Bryce
By Harry M. Saragovitz
Edward J. Kelly, Herbert Berl
& S. Dubroff
ATTORNEYS.

United States Patent Office 3,529,466
Patented Sept. 22, 1970

3,529,466
ULTRASONIC INSPECTION APPARATUS FOR ROTATABLE CYLINDRICAL OBJECTS AND BODIES OF ELASTIC MATERIAL
William J. Pryor, Cherry Hill, N.J., Richard A. Meinert, Southampton, Pa., and William C. Truckenmiller, David Murphy, and John Bryce, Albion, Mich., assignors, by direct and mesne assignments, to the United States of America as represented by the Secretary of the Army
Filed Apr. 14, 1967, Ser. No. 631,107
Int. Cl. G01n 29/04
U.S. Cl. 73—67.8
2 Claims

ABSTRACT OF THE DISCLOSURE

An ultrasonic non-destructive testing and inspection system for such elements as artillery shells and the like is provided for ascertaining the presence or absence of metallurgical and mechanical discontinuities appearing therein. Access is only to the outer shell surface, without direct contact therewith, through the use of ultrasonic waves of the traverse or shear type provided by a pulsed transducer positioned at a critical acute angle in a vertical plane at right angles to the longitudinal axis of the shell.

---

This invention relates to ultrasonic inspection apparatus for nondestructive testing of rotatable cylindrical objects and bodies of elastic material such as steel or iron for defects; such as mechanical and metalluritical discontinuities in the material thereof. Artillery shells are readily adapted for tests in accordance with the invention which provides means for inspecting the internal soundness of such objects and like cylindrical objects of varying longitudinal cross-section by access only to the outside surface and without physical contact therewith.

Ultrasonic inspection involves a method for sending a very-high-frequency sound wave through metal in a controlled direction, reflecting it from an impeding surface back to a receiver, and measuring any time delays in the return of any part of the wave. The return waves are traced on a cathode-ray tube screen. The interpretation of the wave pattern shown on the screen is the basis of approval or rejection of the part or article being tested. This is the general principle of operation of many ultrasonic inspection systems, and involves a consideration of sound waves which are mechanical vibrations originating in or transmitted by any elastic material. When an object such as a bell is struck, the impact of the hammer or like strikes sets the bell into vibration and vibrations therefrom are transmitted to the surrounding air. These vibrations are received by the human ears as sound, although the bell was the original source. These vibrations are in the audible frequency range between approximately 20 and 20,000 cycles.

As the frequency of the sound vibration is increased, it progressively approaches and finally exceeds the maximum capability of the human ear to hear it. Such waves are referred to as ultrasonic waves or vibrations, and this term embraces all vibrational waves of a frequency greater than the approximately 20 kc. value referred to. Frequencies in the range of 20 kc. to 100 kc. per second are utilized in communications, underwater signalling and sonic ranging equipment. The still higher frequencies of 500 kc. to 10,000 kc. per second (½ to 10 megacycles) constitute the frequency range used in ultrasonic testing in accordance with the invention.

An ultrasonic wave traveling through metals or other elastic materials of that type causes different specific motions of the particles of the body. For example, if the movement of the particles of the body are essentially parallel to the direction of the wave motion, the wave is said to be longitudinal. If the motion is perpendicular to the direction of the wave, the wave is said to be a transverse or shear wave. This latter type is used in inspecting rotating cylindrical objects and bodies of elastic materal in accordance with the invention.

A further characteristic of vibrational waves in bodies involves the decline in the amplitudes of the waves from the initial amplitude of the first wave and is caused by a damping or attenuation in the material. The phenomenon of attenuation or damping is significant in ultrasonic testing. Also ultrasonic vibrations have two basic characteristics on which the practice of ultrasonic testing of rotating bodies depends.

(1) They are reflected by mechanical internal changes and discontinuities occurring in the substance or medium through which they are traveling.

(2) The tendency to travel in a straight line, such as light waves, increases as the wave length is reduced, or as frequency is increased.

In ultrasonic testing of the type involving the present invention, the apparatus for generating ultrasonic waves utilizes the "piezoelectric" effect. As is known piezo-electric crystals have the property of transforming electrical impulses into mechanical vibrations, and also transforming mechanical vibrations into electric impulses. Therefore, a crystal may be used as either a vibration transmitting medium or as a vibration receiver. Piezoelectric transducers for ultrasonic inspection employ materials which generate electric charges when mechanically stressed and, conversely, become stressed when electrically excited at these higher frequencies. As a transducing element, quartz crystals have been preferred because of their electrical and mechanical stability and resistance to aging, or decline in response, over a period of time, and the ability to withstand high operating temperatures. After careful experiments, it has been found that a transducer using a lead zirconate crystal may have as much as 10 to 12 times the efficiency of the same size quartz crystal. It is also insoluble when operating under water and is not effected by high operating temperatures. The greater acoustical efficiency means that the crystal can be driven at a lower power input, and the returning signals can be clear of interfering ground signals. This gives promise of increasing the mechanical sensitivity to an entirely new order, which implies that the detection of still smaller defects may be possible with this inspection system.

As to size, a relatively small diameter crystal is found to give the best results for ultrasonic testing in accordance with the invention, and may in this case have a diameter as small as ⅜ of an inch. This provides a small concentrated beam and the location of defects therewith is far easier than with a larger crystal and beam. Also a preference for a frequency of 2.25 megacycles has been found, although any frequency between 1 and 5 megacycles may be used.

In accordance with the invention, a single sound transducer of the type referred to as transmitter and receiver element, is caused to move over the surface of a rotating cylindrical body in uniformly spaced relation to said surface and in substantially a straight line longitudinally, while at the same time being tilted at an angle to the axis, to apply and receive back a sound beam at a predetermined angle of incidence with respect to the surface of the body. It is assumed that a body or object can more readily be inspected in higher production if its shape is symmetrical and capable of rotation in a fixture. This is particularly true of artillery shells which are hollow cylinders of variable diameter from base to tip, as is understood. The present system thus is particularly adapted for testing cylindrical bodies of this type which are of a varying diameter from end to end.

It has been found in accordance with the invention, that any ultrasonic inspection system for bodies of this type is extremely sensitive to the angularity of incidence of the sound beam on the surface of the body or shell. When the same angularity of incidence of the beam was maintained on similar defects in different locations, the signal response has been found to be relatively uniform. Also of great significance was the angle at which the search beam strikes the rotating cylindrical body or shell surface. After considerable research it was found that the transducer unit may be set up at a 3° to 6° angle with respect to the axis of the body for improved results.

The use of a single transducer as both transmitter and receiver element introduces complications in operation due to the fact that it cannot be transmitting and receiving at the same time. Otherwise confusion and signal mixing would be the result.

This is prevented in the present example, by actuating the crystal to transmit for a controlled period of time at a rate of several hundred times per second. Six-hundred times per second has been found suitable, which in this case would be approximately 2500 millionths of a second. Thus the crystal may vibrate for periods measurable in millionths of a second, and then rest or listen for the balance of the excitation cycle.

Sound travels through steel at about 229,000 inches per second. Therefore, in the 2 millionths transmitting phase of the above example, the sound must go through about ½ inch of steel by direct transmission, or ¼ inch of steel by a single projection-reflection path. For sections thinner than ¼ inch steel on a single projection-reflection path, a sound wave would be reflected back to the crystal before the generating phase had been completed, thus resulting in a confused, unreliable signal on the tube screen. This problem is solved, for ultrasonic sound inspection in accordance with the invention, by the use of a liquid transmitting couplant such as water immersion for example.

In water, sound travels only 54,000 inches per second or approximately ¼ as fast as in steel. Therefore, if a steel shell or body is submerged in a water bath, the speed of transmission of sound to and from said shell or body is so reduced that the excitation transmitting phase at the crystal is completed before the reflected sound can be returned to the resting crystal. As little as $\frac{1}{16}''$ of water between the crystal and rotating body may be satisfactory, although a wide spacing and longer path through the coupling medium is preferred. Furthermore in accordance with the invention, the pulse timing relationship is not the only reason for immersion testing. The continuous curving surface of the body or shell, to be searched, presents a difficult problem in providing surface contact with the flat face of the crystal, besides offering the further possible problem of contact and resultant crystal wear. This is prevented by immersion control means for the two elements.

The invention will further be understood from the following description, when considered with reference to the accompanying drawings, and its scope is pointed out in the appendant claims.

In the drawing:

FIG. 1 is a schematic mechanical representation and block circuit diagram of an ultrasonic inspection apparatus in accordance with the invention, FIG. 1A is a fragmentary view of a portion of FIG. 1 showing a different oscilloscope pattern used in testing, in accordance with the invention, FIG. 2 is a plan view, in perspective, of one embodiment of the invention as used in production, showing certain elements of the system of FIG. 1 in actual operation, FIG. 3 is a diagrammatic representation of the apparatus showing an end-view of a rotating body or shell in operative relation to the transducer element for testing in accordance with the invention, Referring to the drawing, wherein like parts throughout the various figures are designated by like reference characters, and referring particularly to FIG. 1, a shell casing or like cylindrical body 5, prior to being tested or inspected ultrasonically, is placed in a steel tank or container 6 and mounted to rotate between two fixed arbors 7, on a longitudinal axis.

The tank is filled with a couplant liquid 8 to a level 8A fully immersing the rotating body. The associated couplant unit or transducer 10 is guided to move in a path 9, in a vertical plane as viewed in the drawing and in fixed, spaced parallel relation to the curvilinear surface of the body on 5 so that the distance or spacing S, as indicated in FIG. 1, is maintained constant throughout the movement of the transducer device from one end position as indicated at 10A, to an opposite end position, as indicated at 10B, along the set pattern.

The transducer 10 is connected to suitable circuit leads in a protective cable or connection lead 14 with an amplifier 15 which is adapted to transmit and to receive signals as indicated by the arrowed lines on opposite sides of the cable 14. The amplifier 15 is connected to receive signal pulses from a pulse generator 16, the frequency of which is controlled in turn by a rate generator 17 connected with the pulse generator as indicated. The pulse output from the amplifier 15, represented by signals received from the transducer element 10 are applied to a suitable indicator such as an oscilloscope 20 through a suitable circuit lead or cable connection indicated at 21.

The pulse generator 16 operates to deliver short repetitive high-frequency electrical pulses to the amplifier 15 which may be considered to be at a frequency of 2.25 megacycles in the present example. This controls the number of vibrational waves which are transmitted to the transducer 10 through the amplifier 15.

The rate generator 17 is set for a fixed repetition rate and acts as a timer for the pulse generator. In the present example, this repetition rate has been taken to be 600 cycles per second. Thus, as described here before, the crystal vibrates 600 times per second with a duration of substantially 2 millionths of a second to each pulse and then rests or waits for the balance of the excitation cycle to receive the signal back from the transducer 10 over a period of approximately 2500 millionths of a second, in duration.

Assuming that the casing or shell 5 is of steel and adapted to carry the sound therethrough at a rate of nearly 230,000 inches per second, the liquid couplant between the transducer and the surface of the casing or shell, indicated by the spacing S in FIG. 1, is sufficient to produce a slower rate of travel of substantially 54,000 inches per second, in the case of water as the couplant. By this means the pulse timing relationship is such that a signal may be received on the transducer 10 and transmitted through the casing and returned to the oscilloscope without interference one with the other.

The transducer 10 is moved at a uniform rate along the path 9 with uniform spacing from the outer curved surface of the rotating body 5 and with a liquid couplant of predetermined thickness or length. Thus, the transducer is spaced from the surface of the body under test at a predetermined fixed distance while fully immersed in a liquid couplant such as water for example. This not only slows up the signal travel rate uniformly because of the even spacing S or couplant thickness, but also provides a couplant without frictional contact between the transducer element and the moving body surface.

In FIG. 1A the oscilloscope 20 is provided with a screen 25 on which appears the oscilloscope pattern 26 representing the horizontal trace. In the present example, the trace also includes a transmitted initial pulse peak 27 and a reflected pulse peak 28, which are followed by a shelf 29 on the horizontal trace and a gated pulse section 30, below the trace level. This pulse source preferably is a generator included in the oscilloscope supply means which energizes the lower vertical deflection plate and forms square waves which are used to measure distance units between deflection peaks on the screen.

In FIG. 1A the transmitted and reflected pulses are shown together with a peak 32 indicating a defect in the material of the body being tested.

Referring to FIG. 2 along with FIG. 1, the rotating body 5, immersed or submerged in the couplant liquid in the tank 6, is shown mounted between axial supporting and centering elements 7, one of which is shown and driven through a connecting gear box 33 by a driving motor 36 which is mounted in fixed position on the frame of the apparatus 35. A second motor 37 serves to drive a rotary threaded traverse screw 38 through belt coupling means 39 as indicated.

The transducer unit 10 is mounted on a swinging arm or a supporting element 40 carried by a moving bracket 41. The latter is mounted on a horizontal supporting plate 42 in which is provided a longitudinally extending slot 43 having a curved portion so related in shape to the curve or surface curvature of the body to be tested that the transducer unit is maintained in uniformly spaced relation to the outer curved surface thereof at all points along the full length of longitudinal travel. The carrier bracket 41 is made to track this groove and is connected with the rotary traverse screw 38 to be moved thereby longitudinally as it rotates. Thus the arm 40 is made to carry the transducer 10 in a horizontal plane in fixed spaced relation to and along the surface of the body or shell 5, with fixed spacing therefrom and coupled only by the liquid couplant in the tank 6. The moveable carriage and groove system of control for the transducer unit 10 in the horizontal plane is relatively simple and effective.

Referring to FIG. 3 along with the preceding figures of the drawing, the control of the transducing unit in the vertical plane is shown on an enlarged scale with spacings and distances somewhat extended in order to show the principle in operation. In FIG. 3 the crystal unit of the transducer unit 10 is shown at 45 and is located in the rear end of a Lucite crystal holder 46. The crystal holder is provided with a central open bore or tubular channel 47 extending axially forward from the transducing unit 45 with a forward end opening 48 adjacent to the surface of the rotating shell or body 5. It will be noted that the shell 5 rotates towards the transducing unit, that is, the surface of the shell or body moves toward the transducing unit as it rotates.

Vibrations or pulses are transmitted from the crystal unit 45 through the channel 47 in the forward direction indicated by the axial transmission line 50 and are sent through the walls of the test body or shell 5 by reflection from the inner face thereof, as indicated at 51, until it meets the defect in the material of the shell or body, as indicated at 53. The transmitted vibration or pulse is then reflected back to the crystal by progressive deflection from the inner surface to the outer surface along a path indicated by the lines 54 and 55. For the testing of a cylindrical body under a couplant liquid, such as water, by a piezoelectric crystal unit 45, the latter is set at a vertical angle of substantially 5° for example, as indicated at X. Sound waves strike the outside of the body at somewhat greater angle than 5° due to two factors.

(1) The center line of the crystal is above the center of rotation of the shell, as indicated.

(2) The ultrasonic beam following a path indicated by the lines 50 and 51 and passing through the liquid or water couplant to the shell, is refracted or bent much as a light beam is refracted when it passes from one transparent medium to another. This refracted angle is proportional as the velocity of the sound in the two media.

Upon entering the shell or body at the above angle, the vibration or pulse beam passes diagonally through the shell to the inside diameter of the shell. At this interface it is reflected at the same angle as the angle of incidence therewith and returns to the outside surface where it is reflected back again, and repeats this indefinitely until the sound energy is fully dissipated. Consequently, there is no back reflection to the crystal unless the defect such as 53, which may be a crack, a void, or a hole in the material, is encountered. Such a new interface directly reflects the sound wave. It retraces its path and shows on the cathode-ray tube screen as a delayed, reflected response which the operator identifies and locates, as indicated for example in FIG. 1A at the oscilloscope face 25.

As the body 5 is rotated in its fixture, the sound waves emitted from the crystal continue to bombard the surface and maintain substantially the same pattern of reflections as they successively and continuously encircle the surface in an uninterrupted spiral, the fact that the rotary traverse screw 38 is turning to carry the carriage of frame 41 from right to left, as viewed in FIG. 2 for example. As the body rotates, the fixed pattern of the sonic beam in the shell insures all sections of the shell being covered.

In the present example, the inspection is performed using a 3/8" round crystal at a frequency of 2.25 megacycles. Consequently a fairly broad beam is provided which shows a strong reflection over a 4° variable angle of incidence ($\pm 2°$). At a 12° angle ($\pm 6°$) about 1/3 of its indication is lost. Thus a marked decline in output is experienced with a wider angle than above.

This phenomenon of beam spread over varying angles of beam incidence does not permit the size of the internal defect to be determined by the height or breadth of the oscilloscope pattern. Therefore, from a practical point of view, pulses or pips of equal height and width on the oscilloscope pattern cannot be interpreted as indicating defects of equal size or shape.

With the search unit movement controlled by the curved slot or cam 43, which keeps the crystal or search unit approximately an even distance from the outside diameter of the body or shell along its entire length, an improved and uniform output is attained from the transducer. This distance may be as low as one inch and much less than as indicated in FIG. 3 which is an enlarged diagrammatic representation for the purpose of better showing the operation of the system. The 3/8 inch diameter quartz crystal is propelled by the 1/4 inch pitch traversing screw 38 which turns at approximately 127 r.p.m. while the test body or test shell rotates at approximately 287 r.p.m. The broad sonic beam of the crystal may thus search the outside diameter of the body substantially one and one-half times in a single straight through path. The material is therefore thoroughly checked for defects throughout the length of body or shell. A larger quartz crystal may be used in general practice, such as a 1/2" x 2 1/4" crystal. Also in practice, a lead zirconite crystal is used instead of quartz, to obtain a higher efficiency in operation.

The frequency of operation of both generators is selected at 2.25 megacycles as a practical consideration, and is a compromise based on sensitivity, resolution and penetration. Higher frequencies are based for higher sensitivity and resolution, while lower frequencies are selected for greater depth of penetration of sound.

The ultrasonic inspection apparatus of the present invention involves the use of cam control means for the piezoelectric sound transducer or search unit which transmits and receives the high-frequency waves through the rotating shell. The search unit is held at a constant distance from the shell surface, which is curved, as it is traversed longitudinally from one end to the other of the rotating shell. Also the angle of incidence of the sound wave to the shell surface is very critical and is likewise maintained constant by the cam control means. As has been shown in FIG. 2 this may be a follower connected with the search unit carrier and a curved cam groove in which the follower is guided to move.

Stated in other words it will be seen that the present system or apparatus, in accordance with the invention, provides an ultrasonic transducer search unit and control means therefor for maintaining said unit in longitudinal traversing movement at a fixed distance and angular relation to the curvilinear longitudinal surface contour of a cylindrical test body in rotation on its longitudinal axis. The search unit is connected and operated for transmitting and receiving high-frequency sound waves through the walls of said test body for locating internal defects by reflection and detection of said waves.

Straight cylindrical objects have often been tested for internal defects by ultrasonic waves, but it has not been obvious that the transducer would have to follow the contour of cylindrical objects of varying diameter and wall thickness to obtain accurate and reliable results.

Furthermore, the present system operates under water or with a liquid layer of sound-conducting material separating the transducer from the curvilinear surface of the object being tested. The system thus uses a liquid couplant medium between the transducer and the object being tested. This has the advantage that the liquid couplant medium has a lower conductivity for sound waves than the material being tested, such as steel, or iron, thereby lengthening the time of projection and reflection to aid in separating the transmission operation from the reception of the return signals. Therefore, if the crystal and the shell or body to be tested are emersed in a liquid bath such as water, the speed of transmission of the sound is so reduced that the excitation-transmitting phase of the operation at the crystal or transducing unit is completed before the reflected sound can be returned thereto for reception and deduction. Substantially one inch separation between the crystal and the surface of the body being tested is provided in most cases and the transducer traverses the body to be tested in a curvilinear path in a plane such as a horizontal plane passing through the axis of the rotating body. The scanning or directing of the sound waves through the body of the casing or shell is applied at substantially a five degree angle to the vertical end in a vertical plane normal to the axis of the rotating body. The continuous curving surface of the body being tested can thus be searched without contact between the transducer and surface of the body thereby cutting down any possibility of wear or friction, while at the same time the sound waves are reduced in speed of vibration as is desirable for purposes of using one transducing unit for both transmitter and receiver.

Thus there is provided in accordance with the invention, a new and improved testing or inspection apparatus and system for non-destructive testing of such elements as shells and the like for metallurgical and mechanical discontinuities. The internal soundness of a tapered shell or other like cylindrical body is thus inspected by access only to the outer surface of the shell itself and without direct contact therewith, through the use of ultrasonic waves of the traverse or shear type with motion perpendicular to the direction of the wave in the particles of the shell or other body being tested.

We claim:
1. In an ultrasonic inspection apparatus including a frame, the combination of:
   a piezoelectric sound transducer unit for transmitting and receiving ultrasonic signal waves;
   means for holding and rotating, in one direction and at a fixed speed, a cylindrical metallic test body of varying diameter and wall thickness providing a longitudinally-curved outer surface;
   means for holding said transducer unit and including a rotary traverse screw for causing said transducing unit to be traversely moved across said test body surface contour, without contact therewith, longitudinally from one to the other end at a predetermined rate;
   a guide plate connected to said frame and having a longitudinally extending slot therein having a curved portion substantially identical to the surface curvature of said test body;
   a swing arm connected to said transducing unit;
   a carrier element connected both to said swing arm and said rotary traverse screw and slidably positioned within said slot to be guided thereby and to maintain said transducer unit at a fixed acute angle in a vertical plane at predetermined fixed angle to the surface of said test body and at a uniform spaced relation to the surface contour thereof throughout said traversing movement, whereby said transducing unit applys and receives, throughout said traversing movement, ultrasonic signal waves through said test body surface at fixed angles of incidence and reflection to locate by shear-wave deflection internal defects in said test body.

2. An ultrasonic inspection apparatus according to claim 1, further including:
   means providing a liquid couplant for ultrasonic wave transmission between said transducing unit and the surface contour of said test body without direct contact therewith;
   means connected to said transducer unit for applying ultrasonic signals thereto in a low megacycle range and at a predetermined periodic rate; and
   means including an oscilloscope for deriving and indicating reflected ultrasonic waves from said body through said transducer unit.

References Cited
UNITED STATES PATENTS

| | | | |
|---|---|---|---|
| 2,527,986 | 10/1950 | Carlin | 73—67.8 |
| 3,074,268 | 1/1963 | Rafferty et al. | 73—67.5 |
| 3,225,136 | 12/1965 | Furon | 178—6.6 |
| 3,036,151 | 5/1962 | Mitchell et al. | 178—6.6 |
| 3,295,362 | 1/1967 | Wood et al. | 73—67.9 |
| 3,308,652 | 3/1967 | Appel et al. | 73—71.5 |

RICHARD C. QUEISSER, Primary Examiner

C. E. SNEE III, Assistant Examiner